United States Patent
Hamamoto et al.

(10) Patent No.: US 10,910,619 B2
(45) Date of Patent: Feb. 2, 2021

(54) ION CONDUCTING MEMBRANE, MAKING METHOD THEREOF, SECONDARY BATTERY COMPRISING THE SAME

(71) Applicant: SAMSUNG ELECTRONICS CO., LTD., Suwon-si (KR)

(72) Inventors: Nobuo Hamamoto, Suwon-si (KR); Shintaro Kitajima, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 84 days.

(21) Appl. No.: 16/118,509

(22) Filed: Aug. 31, 2018

(65) Prior Publication Data

US 2019/0334147 A1  Oct. 31, 2019

(30) Foreign Application Priority Data

Apr. 25, 2018  (KR) .................. 10-2018-0047925

(51) Int. Cl.
*H01M 2/14* (2006.01)
*H01M 2/16* (2006.01)
*H01M 2/18* (2006.01)
*H01M 10/0525* (2010.01)

(52) U.S. Cl.
CPC ............. *H01M 2/16* (2013.01); *H01M 2/145* (2013.01); *H01M 2/18* (2013.01); *H01M 10/0525* (2013.01)

(58) Field of Classification Search
CPC ........ H01M 2/145; H01M 2/16; H01M 2/166; H01M 2/1686; H01M 2/18; H01M 10/0525; H01M 10/054
See application file for complete search history.

(56) References Cited

U.S. PATENT DOCUMENTS

| | | |
|---|---|---|
| 4,977,007 A | 12/1990 | Kondo et al. |
| 9,780,303 B2 | 10/2017 | Nobuo et al. |
| 9,911,957 B2 | 3/2018 | Choi et al. |
| 2015/0079485 A1* | 3/2015 | Choi ................ B32B 27/32 |
| | | 429/403 |
| 2016/0181585 A1 | 6/2016 | Choi et al. |
| 2017/0093002 A1 | 3/2017 | Choi et al. |

(Continued)

FOREIGN PATENT DOCUMENTS

| | | |
|---|---|---|
| KR | 20150031377 A | 3/2015 |
| KR | 20160040941 A | 4/2016 |
| KR | 20160075292 A | 6/2016 |

(Continued)

OTHER PUBLICATIONS

"Expanded polystyrene foam scene", https://www.youtube.com/watch?v=px29RRZfZm4&feature=youtu.be, Published on Mar. 11, 2014 by Jepsa Eps.

(Continued)

*Primary Examiner* — Brittany L Raymond
(74) *Attorney, Agent, or Firm* — Cantor Colburn LLP

(57) ABSTRACT

An ion conducting membrane includes: a membrane substrate including a membrane-forming particle and an ion conductive particle disposed on the membrane substrate, wherein the membrane-forming particle include an expandable material, and the ion conductive particle is exposed on both an upper surface and an opposing lower surface of the membrane substrate.

23 Claims, 19 Drawing Sheets

(56) References Cited

U.S. PATENT DOCUMENTS

2018/0145296 A1  5/2018  Choi et al.
2018/0145297 A1  5/2018  Choi et al.

FOREIGN PATENT DOCUMENTS

KR  20170037495 A   4/2017
WO   2015132681 A1  9/2015
WO   2015157339 A1  10/2015

OTHER PUBLICATIONS

Nagaphani B. Aetukuri et al., "Flexible Ion-Conducting Composite Membranes for Lithium Batteries", Advanced Energy Materials, May 12, 2015, pp. 1-6, vol. 5, Issue 14.

* cited by examiner

ION CONDUCTING MEMBRANE, MAKING METHOD THEREOF, SECONDARY BATTERY COMPRISING THE SAME

This application claims priority to and the benefit of Korean Patent Application No. 10-2018-0047925 filed in the Korean Intellectual Property Office on Apr. 25, 2018, the entire content of which is incorporated herein by reference.

BACKGROUND

1. Field

An ion conducting membrane, a method of making thereof, and a secondary battery are disclosed.

2. Description of the Related Art

According to growing need for a secondary battery with high-capacity and high power, a variety of secondary batteries, such as lithium ion batteries, have been researched. An all-solid-state battery and a secondary battery including metal-oxygen, metal-air, or a gas mixture of other metals, may have a theoretical specific energy which is 3 to 5 times that of a lithium ion battery due to the higher atomic density of lithium.

In a positive electrode of a secondary battery, a metal atom (e.g., a lithium atom) may be oxidized to form an ion (e.g., a lithium ion) and an electron. The produced ion may be moved to a negative electrode by an electrolyte, so as to be reacted with gas.

An ion conducting membrane, passing the ion but not permeating moisture or the like, may be disposed between the electrolyte and the positive electrode. The ion conducting membrane may block the exchange of other materials, while allowing exchange of ions between the positive electrode and the negative electrode to prevent other materials from causing a side-reaction.

Nonetheless, there remains a need for an improved ion conducting membrane having improved workability and mechanical flexibility, can be produced in a large area, and also to have suitable ion conductivity, and barrier properties to a reactive material, such as water, oxygen, carbon dioxide, and the like.

SUMMARY

An ion conducting membrane having improved workability, flexibility, ion conductivity, and barrier properties is provided.

In addition, a method of making the ion conducting membrane with a simple process is provided.

A secondary battery providing improved ion conductivity and a reduced side-reaction of an electrode by including the ion conducting membrane is provided.

An ion conducting membrane according to an embodiment includes: a membrane substrate including a membrane-forming particle, and ion conductive particle disposed on the membrane substrate, wherein the membrane-forming particle include an expandable material, and the ion conductive particle is exposed on both an upper surface and an opposing lower surface of the membrane substrate.

The membrane substrate may have insulation properties.

The expandable material may include a thermoplastic resin and/or a thermal fusion resin.

The membrane substrate may include at least two expanded membrane-forming particles that are fused.

The membrane-forming particle may include a core, wherein the core is hollow, and a shell surrounding the core, wherein the shell includes the expandable material.

The membrane-forming particle may consist of the expandable material and may include at least two pores thereinside.

When a diameter of the ion conductive particles is Di, a diameter before expansion of the membrane-forming particles is Dos, and a ratio of a volume after expansion relative to a volume before expansion of the membrane-forming particles is N, Di, Dos, and N may satisfy Equation 1.

$$Dos \leq Di/[2*N^{1/3}] \qquad \text{Equation 1}$$

In Equation 1, Di, Dos, and N satisfy may satisfy Equation 2.

$$Dos \leq Di/[0.155*N^{1/3}] \qquad \text{Equation 2}$$

In Equation 2, N may be from about 10 to about 500.

The ion conductive particle may conduct a lithium ion, a sodium ion, a proton, a potassium ion, an iron ion, a zinc ion, a magnesium ion, a potassium ion, or a combination of at least one of the foregoing.

The ion conductive particles may have ion conductivity of about $1 \times 10^{-5}$ Siemens per centimeter (S/cm) to about $1 \times 10^{-3}$ S/cm.

The ion conductive particles may include a sulfide, an oxide, a nitride, or a combination of at least one of the foregoing.

The ion conductive particles may include $ZrO_2$, $AlO_3$, or a compounds represented by Chemical Formula 1 to Chemical Formula 4,

  $Li_3La_{(2/3-x)}TiO_3$   Chemical Formula 1

  $Li_yLa_3M^1{}_2O_{12}$   Chemical Formula 2

  $Li_{(2-2z)}Zn_{(1-z)}GeO_4$   Chemical Formula 3

  $LiM^2{}_2(PO_4)_3$   Chemical Formula 4 or a combination comprising at least one of the foregoing.

In Chemical Formula 1 to Chemical Formula 4, $M^1$ may be zirconium (Zr), niobium (Nb), tantalum (Ta), antimony (Sb), bismuth (Bi), or a combination of at least one of the foregoing, $M^2$ may be germanium (Ge), titanium (Ti), hafnium (Hf), and zirconium (Zr), or a combination of at least one of the foregoing, and $0 \leq x \leq 2/3$, $5 \leq y \leq 7$, and $0 \leq z < 1$.

The ion conductive particle may have a larger specific gravity than the membrane-forming particle.

A thickness of the ion conducting membrane may be from about 15 micrometers (μm) to about 100 μm.

A method of making an ion conducting membrane according to another embodiment includes: distributing the membrane-forming particle on a first substrate; distributing the ion conductive particle on the first substrate; and compressing the membrane-forming particle and the ion conductive particle to make the ion conducting membrane.

The ion conductive particle may be distributed after distribution of the membrane-forming particle.

The ion conductive particle may be settled by applying vibration to the first substrate after distribution of the ion conductive particle.

When compressing the membrane-forming particle and the ion conductive particle, a second substrate may be disposed on the distributed membrane-forming particle and ion conductive particle and the first substrate and the second substrate may be pressed.

The pressing may be performed at a pressure of about 1 megaPascal (MPa) to about 50 MPa.

When compressing the membrane-forming particle and the ion conductive particle, the distributed membrane-forming particle and ion conductive particle may be heated.

The heating may be performed at a temperature of about 120° C. to about 300° C. for about 15 seconds to about 5 minutes.

A secondary battery according to another embodiment includes a positive electrode; a negative electrode; and the ion conducting membrane between the positive electrode and the negative electrode.

The ion conducting membrane may have excellent workability and flexibility, ion conductivity, and barrier properties. In addition, the ion conducting membrane may be obtained by a relatively simple method, so the ion conducting membrane may be mass produced.

The secondary battery including the ion conducting membrane has excellent ion conductivity and also minimizes the side-reaction of the electrode, so as to show improved efficiency and life-span.

BRIEF DESCRIPTION OF THE DRAWINGS

The above and other advantages and features of this disclosure will become more apparent by describing in further detail exemplary embodiments thereof with reference to the accompanying drawings, in which.

DETAILED DESCRIPTION

Figure 1:
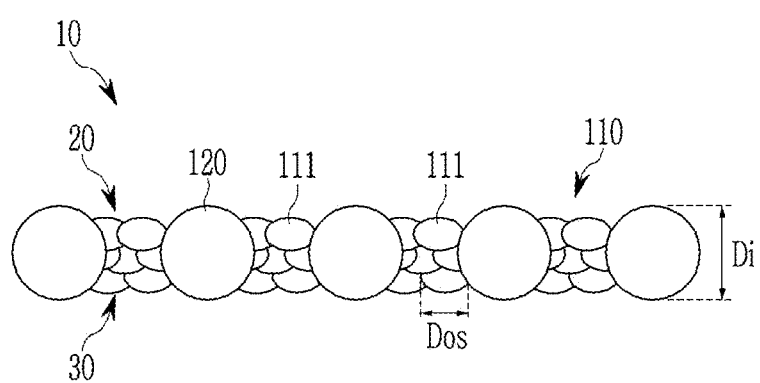
FIG. 1 is a schematic view of an embodiment of an ion conducting membrane.

Example embodiments of the present disclosure will hereinafter be described in further detail, and may be easily performed by a person having an ordinary skill in the related art. However, this disclosure may be embodied in many different forms, and is not to be construed as limited to the example embodiments set forth herein.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

As used herein, for a particle diameter of a particle in the present disclosure, although it may be numerized by a measurement to show an average size of a group, the used method includes a mode diameter showing the maximum value of the distribution, a median diameter corresponding to the center value of integral distribution curve, and a variety of average diameters (numeral average, length average, area average, mass average, volume average, etc.), and the like. Unless particularly mentioning otherwise, an average particle diameter means a numeral average diameter in the present disclosure, and it is obtained by measuring D50 (particle diameter at a position of distribution rate of 50%).

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

There remains a need for an improved ion conducting membrane having selective ion exchange (for example, selective to a lithium ion), improved workability, large area, mechanically flexibility, high ion conductivity, and barrier properties to reactive materials such as water, oxygen, carbon dioxide, and the like.

Materials such as organic gel, organic polymer, inorganic non-oxide, ceramic glass, and the like, do not satisfy all of the above mentioned properties.

For example, the organic gel has weak mechanical strength, is vulnerable to gas, and shows no ion conductivity. The organic polymer shows no ion conductivity. The inorganic non-oxide does not satisfy barrier properties due to its hygroscopicity and its reactivity with oxygen and the like. The ceramic glass has low mechanical strength, low flexibility due to its brittleness, and is difficult to produce in a large area without increasing thickness.

As a substitute to these materials, an organic/inorganic hybrid ion conducting membrane has been suggested. The organic/inorganic hybrid ion conducting membrane provides thermal stability and ion conductivity through an inorganic ion conducting material and provides workability, flexibility, and other mechanical properties through an organic polymer.

However, the organic/inorganic hybrid ion conducting membrane applies a wet process during formation of an organic/inorganic composite membrane. Thus it is difficult to achieve mass production because of complications such as etching the remaining organic polymer region and removing the same after coating the organic polymer.

In an attempt to simplify production, the inorganic ion conducting material may be disposed, the organic polymer may be coated under vacuum conditions, and a grid may be disposed during the drying process However, the organic polymer may be insufficiently permeated under the grid, and covering the organic polymer on the inorganic ion conducting material is problematic. Thus the manufacturing method is difficult to control and is not suitable for the mass production.

Accordingly, there remains a need for an improved ion conducting membrane having improved workability, flexibility, ion conductivity, and barrier properties, capable of being produced by a simple method that allows for mass productivity.

An embodiment may provide a mass producible ion conducting membrane having improved workability, flexibility, ion conductivity, and barrier properties, and a method of manufacturing the same.

Hereinafter, a structure of an ion conducting membrane according to an embodiment is described.

FIG. 1 is a schematic view of an ion conducting membrane according to an embodiment.

Referring to FIG. 1, an ion conducting membrane 10 according to an embodiment includes a membrane substrate 110 including a membrane-forming particle 111, and an ion conductive particle 120 disposed in the membrane substrate 110.

In an embodiment, the ion conductive particle 120 may be exposed from both surfaces of the membrane substrate 110. In other words, the ion conductive particle 120 may be exposed from both opposing surfaces (referring to FIG. 1, upper surface 20 and opposing lower surface 30) of the membrane substrate 110.

The ion conducting membrane may be disposed between a positive electrode and a negative electrode of the secondary battery, and the opposing surfaces may be disposed facing each of the positive electrode and the negative electrode. Accordingly, in order that the ion conducting membrane blocks moisture but selectively passes ions (for example, a lithium ion, etc.), regions having an ion conductivity may be exposed from both surfaces of the ion conducting membrane.

However, as the ion conductive particle 120 is exposed from both surfaces of the ion conducting membrane 100 according to an embodiment as described above, the ion conducting membrane 100 according to an embodiment may selectively pass only ions.

In an embodiment, the membrane substrate 110 may maintain an alignment of a plurality of ion conductive particles 120. In an embodiment, the membrane substrate 110 may be an electrical insulator, e.g., having a conductivity of less than $10^{-7}$ S/cm, e.g., $1 \times 10^{-12}$ to $1 \times 10^{-7}$ S/cm. Thereby, the area where the membrane substrate 110 is disposed may block ion exchange and may selectively pass ions through ion conductive particle 120.

The membrane substrate 110 may be electrically insulating and prevent ions from being passed through areas other than the ion conductive particle 120. Furthermore, the membrane substrate 110 may have barrier properties to gases such as moisture, oxygen, and carbon dioxide.

In an embodiment, the membrane substrate 110 may include a membrane-forming particle 111. The membrane substrate 110 may comprise at least two membrane-forming particles 111.

In an embodiment, the membrane-forming particle 111 may include an expandable material. Thus, the membrane-forming particles 111 may have expandability. Thereby, while at least two membrane-forming particles 111 are gathered to form a membrane substrate 110, an empty space between adjacent membrane-forming particles 111 may be minimized or removed by expansion of membrane-forming particles 111.

In an embodiment, the expandable material may be a material having thermal-expandability, a material having a high plastic strain due to an internal pressure when the internal pressure is changed by a heat or the like, or a combination thereof.

In an embodiment, examples of the expandable material include a thermoplastic resin, a thermal fusion resin, or a combination thereof.

Examples of the expandable material include a polymer of a radical polymerizable monomer. Examples of the monomer may be a nitrile monomer such as acrylonitrile, methacrylonitrile, α-chloroacrylonitrile, α-ethoxyacrylonitrile, or fumaronitrile; a carbonic acid monomer such as acrylic acid, methacrylic acid, itaconic acid, maleic acid, fumaric acid, or citraconic acid; vinylidene chloride; vinyl acetate; (meth)acrylic acid ester such as methyl(meth)acrylate, ethyl (meth)acrylate, n-butyl(meth)acrylate, isobutyl(meth)acrylate, t-butyl(meth)acrylate, isobornyl(meth)acrylate, cyclohexyl(meth)acrylate, benzyl(meth)acrylate, or β-carboxylethylacrylate, a styrene monomer such as styrene, α-methylstyrene, or chlorostyrene; an amide monomer such as acrylamide, substituted acrylamide, methacrylamide, substituted methacrylamide, or a combination thereof.

In an embodiment, the membrane-forming particle 111 may have both expandability and thermal fusion properties. The fusion property may be a thermal fusion property. The thermal fusion property may be revealed at a temperature of greater than or equal to a melting point and/or a glass transition point (Tg) of a material for the membrane-forming particle 111.

For example, the membrane-forming particle 111 may have both expandability and thermal fusion properties by combining each monomer to provide a flame retardant particle and/or non-combustibility at a temperature greater or equal to a melting point and/or a glass transition point of a material for the membrane-forming particle 111.

The membrane-forming particle 111 may further include an additional coalescing agent in the expandable material, if desired.

In an embodiment, the membrane substrate 110 may comprise at least two membrane-forming particles 111 expanded by the expandable material and fused together. In an embodiment, the membrane-forming particle 111 may have both expandability and fusion properties.

In an embodiment, the membrane-forming particle 111 may have a variety of inner structures. For example, an expandable material may fill the membrane-forming particle 111 without voids, or an empty space may be provided in the membrane-forming particle 111.

Figure 2:
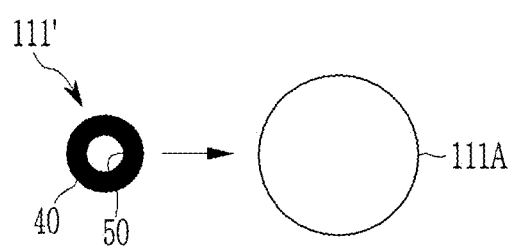
FIGS. 2 to 4 are schematic views showing the embodiments of modifications of a membrane-forming particle for a membrane substrate in an ion conducting membrane.
Figure 3:
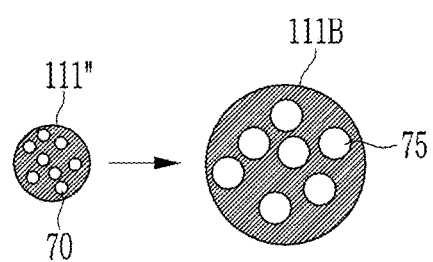
Figure 4:
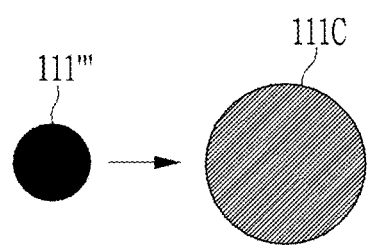

FIGS. 2 to 4 are schematic views showing embodiments of membrane-forming particles for a membrane substrate in an ion conducting membrane.

Referring to FIG. 2, the membrane-forming particle 111' may include a core 50, wherein the core may be hollow, and a shell 40 surrounding the core 50. The shell 40 may include the expandable material.

In an embodiment, the hollow core 50 may be filled with a foaming agent. The foaming agent may be in a liquid phase, a gaseous phase, or a liquid-gas mixed phase. The foaming agent may be gasified at a temperature less than or equal to a softening point of the expandable material.

Examples of the foaming agent may include C2 to C10 fluorine-containing compounds having an ether structure, propane, propylene, butene, normal butane, isobutane, isopentane, neopentane, normal pentane, normal hexane, isohexane, heptane, octane, petroleum ether, a halide of methane, tetraalkylsilane, azodicarbonamide, or a combination thereof.

Thereby, when heat is applied to the membrane-forming particle 111', the hollow volume is expanded by vaporization of the foaming agent, and the expandable material may be plastic-deformed by the inner pressure which is increased by the vaporization of the foaming agent. As a result, as shown in FIG. 2, membrane-forming particle 111' may be expanded to form an expanded membrane forming particle 111A, and both the hollow volume in the membrane-forming particle 111' and the entire volume may be increased.

Also, referring to FIG. 3, the membrane-forming particle 111" may comprise an expandable material and may include at least two pores 70 inside thereof. In this case, at least one of the at least two pores 70 may be filled with the expandable material, e.g., foaming agent.

Thus while the membrane-forming particle 111" shown in FIG. 3 may be expanded as in the membrane-forming particle 111' of FIG. 2, both the pore volume and the entire volume in the membrane-forming particle 111" may be increased to provide an expanded membrane-forming particle 111B as shown in FIG. 3. The expanded membrane-forming particle 111B may comprise an expanded region 75.

Referring to FIG. 4, the membrane-forming particle 111''' may be filled with an expandable material inside thereof. As shown in FIG. 4, even in the case that a foaming agent is not present in the membrane-forming particle 111''', the membrane-forming particle 111m may be thermally expanded by the expandable material to provide an expanded membrane-forming particle 111C. In this case, the thermally-expanded membrane-forming particle 111''' may have a decreased density relative to the initial density and an increased volume due to the plastic deformation of the internal material.

In an embodiment, in order that the ion conductive particle 120 is exposed from both surfaces of the membrane substrate 110, a size of membrane-forming particle 111 may be at least less than or equal to the size of the ion conductive particle 120. In addition, in an embodiment, in order that the mechanical strength of the ion conducting membrane 10 and the ion conductive particle 120 is maintained in greater than or equal to a predetermined level, a specific size relationship of the ion conductive particle 120 and the membrane-forming particle 111 may satisfy Equation 1.

$$Dos \leq Di/(2*N^{1/3})$$ Equation 1

In Equation 1, Di (e.g., as shown in FIG. 1) is a diameter of the ion conductive particle 120, Dos (e.g., as also shown in FIG. 1) is a diameter before expansion of the membrane-forming particle 111, and N is a ratio of a volume after expansion relative to a volume before expansion of the membrane-forming particle 111.

In an embodiment, the N may be greater than or equal to about 5, greater than or equal to about 10, and for example less than or equal to about 500, less than or equal to about 400, less than or equal to about 300, less than or equal to about 200, or about 10 to about 500, or it may be, for example, about 10 to about 300. These ranges for N may provide a membrane substrate 110 having improved mechanical strength and barrier properties due to expansion of the membrane-forming particle 111.

A diameter relationship before the expansion of membrane-forming particle 111 and after the expansion may be represented by Equation 1-1.

$$N(\pi/6)Dos^3 = (\pi/6)Doe^3$$ Equation 1-1

In Equation 1-1, N and Dos are the same as in Equation 1 and Doe is a diameter after expansion of the membrane-forming particle 111.

Equation 1-1 may be summarized with Doe to provide Equation 1-2.

$$Doe = N^{1/3} Dos \qquad \text{Equation 1-2}$$

In order that the ion conducting membrane 10 maintains the ion conductive particle 120 with a mechanical strength greater than or equal to a predetermined level, the membrane-forming particle 111 may be aligned in a thickness direction of the ion conducting membrane 10.

If only a single membrane-forming particle is present in a thickness direction of the ion conducting membrane, the single membrane-forming particle should both attach the ion conductive particle and form the membrane substrate. However, in this case, the mechanical strength of the ion conducting membrane and barrier properties may be weakened.

Accordingly, at least two membrane-forming particles 111 after the expansion are preferably aligned in a thickness direction. The condition that the height of the at least two membrane-forming particles is less than or equal to the diameter of ion conductive particle 120 may be combined with Equations 1-1 and 1-2, and summarized in a formula relating Dos, Di, and N, to provide Equation 1.

In the ion conducting membrane 10 according to an embodiment, Di, Dos, and N may satisfy Equation 2.

$$Dos \leq Di / [0.155 * N^{1/3}] \qquad \text{Equation 2}$$

Figure 5:
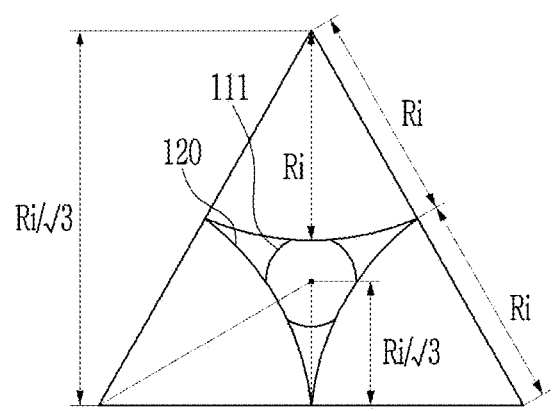
FIGS. 5 and 6 are schematic views showing a size relationship of an ion conductive particle and a membrane-forming particle in an embodiment of ion conducting membrane.
Figure 6:
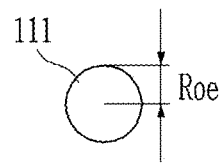

FIGS. 5 and 6 are schematic views showing a size relationship between the ion conductive particle and the membrane-forming particle in the ion conducting membrane according to an embodiment.

In the ion conducting membrane 10 according to an embodiment, the ion conductive particle 120 may be aligned as closely as possible in order to improve the ion conductivity. Accordingly, considering the 2-dimensional alignment, as shown in FIG. 5, when a membrane-forming particle 111 is present among three ion conductive particles 120, it may both align the ion conductive particles 120 and ensure a minimum mechanical strength of the ion conducting membrane 10, at the same time.

Thus further considering the condition, the size relationship between the ion conductive particle 120 and the membrane-forming particle 111 may be represented by Equation 2-1.

$$Roe \leq [3^{1/2} Ri] - Ri - [Ri/(3^{1/2})] Ri [2(3^{1/2}) - 3]/3 = 0.155 Ri \qquad \text{Equation 2-1}$$

In Equation 2-1, Roe refers to a radius after the expansion of the membrane-forming particles 111, and Ri refers to a radius of the ion conductive particles 120.

Accordingly, when the obtained Equation 2-1 is substituted with Equation 1, considering a radius Ros before expanding the membrane-forming particle 111, Equation 2 may be obtained.

In an embodiment, ion conductive particle 120 moves ions to both surfaces of the ion conducting membrane 10 as described above.

In an embodiment, the ion conductive particle 120 may conduct a lithium ion, a sodium ion, a proton, a potassium ion, an iron ion, a zinc ion, a magnesium ion, or a combination comprising at least one of the foregoing.

In an embodiment, the ion conductive particle 120 may provide an ion conductivity of greater than or equal to about $10^{-6}$ Siemens per centimeter (S/cm), greater than or equal to about $10^{-5}$ S/cm, or less than or equal to about $1 \times 10^{-3}$ S/cm, and for example, less than or equal to about $1 \times 10^{-4}$ S/cm, or it may provide an ion conductivity of, for example, about $1 \times 10^{-5}$ S/cm to about $1 \times 10^{-3}$ S/cm, or about $1 \times 10^{-4}$ S/cm.

In an embodiment, the ion conductive particle 120 may include a sulfide, an oxide, or a combination thereof.

In an embodiment, the sulfide may be a material formed by compounding sulfur with a metal, oxygen, a hydrocarbon, or a combination thereof.

In an embodiment, the oxide may be a material formed by compounding oxygen with a metal, a hydrocarbon, or a combination thereof. In an embodiment, examples of the oxide may be $ZrO_2$, $AlO_3$, and compounds represented by Chemical Formulae 1 to 4. That is, the ion conductive particle 120 according to an embodiment may include $ZrO_2$, $AlO_3$, a compound represented by Chemical Formulae 1 to 4, or a combination thereof.

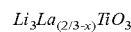  Chemical Formula 1

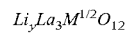  Chemical Formula 2

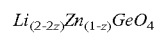  Chemical Formula 3

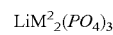  Chemical Formula 4

In Chemical Formula 1 to Chemical Formula 4, $M^1$ is zirconium (Zr), niobium (Nb), tantalum (Ta), antimony (Sb), bismuth (Bi), or a combination comprising at least one of the foregoing, $M^2$ is germanium (Ge), titanium (Ti), hafnium (Hf), zirconium (Zr), or a combination comprising at least one of the foregoing, and $0 \leq x \leq 2/3$, $5 \leq y \leq 7$, and $0 \leq z < 1$.

The ion conductive particle 120 may be only one of the compounds represented by Chemical Formulae 1 to 4, or may be a mixture of at least two of them depending upon the subject ion.

In an embodiment, the ion conductive particle 120 may have a diameter which is greater than or equal to the membrane-forming particle 111, so as to have a larger volume than the membrane-forming particle 111. In an embodiment, the ion conductive particle 120 may have a higher specific gravity than the membrane-forming particle 111.

Because of their higher specific gravity, the ion conductive particle 120 may be below the membrane-forming particle 111 when the ion conductive particle 120 is mixed with the membrane-forming particle 111. As the result, ion conductive particle 120 is easily exposed even on the lower surface of the ion conducting membrane 10.

The ion conducting membrane 10 according to an embodiment may have a thickness of, for example, greater than or equal to about 15 micrometers (μm), greater than or equal to about 20 μm, greater than or equal to about 25 μm, or greater than or equal to about 30 μm and for example, less than or equal to about 100 μm, less than or equal to about 90 μm, or less than or equal to about 80 μm, or it may have a thickness of, for example, about 15 μm to about 100 μm, or about 20 μm to about 90 μm.

When the ion conducting membrane 10 according to an embodiment has a thickness within these ranges, it may provide improved flexibility and workability while having improved mechanical strength and barrier properties.

As described above, the ion conducting membrane 10 according to an embodiment may pass ions through ion conductive particle 120 exposed from both surfaces of the membrane and may block other materials such as moisture, oxygen, and carbon dioxide. In addition, the ion conducting membrane 10 according to an embodiment may provide improved mechanical strength and flexibility and barrier properties by defining a size relationship between the ion conductive particle 120 and the membrane-forming particle 111, and may also provide improved ion conductivity due to the ion conductive particle 120.

Hereinafter, a method of manufacturing the ion conducting membrane according to an embodiment will be further described.

Figure 7:
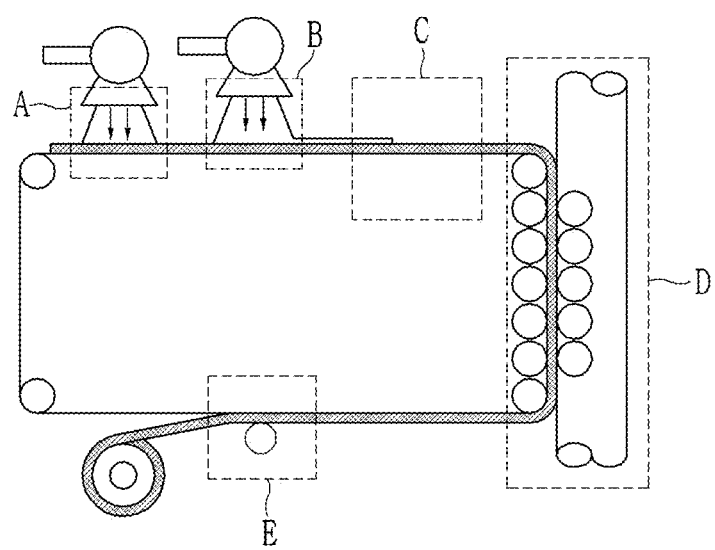
FIG. 7 is a view illustrating an embodiment of a process of producing an ion conducting membrane.

FIG. 7 is a view illustrating a process of manufacturing the ion conducting membrane according to an embodiment.

The method of manufacturing the ion conducting membrane according to an embodiment may include distributing the membrane-forming particle and the ion conductive particle and compressing the membrane-forming particle and the ion conductive particle. The method of manufacturing the conducting membrane may be sequentially carried out in processes A to E as shown in FIG. 7.

Hereinafter, a method of manufacturing the ion conducting membrane will be specifically described further referring to FIGS. 8 to 12.

FIGS. 8 to 12 are schematic views more specifically showing A to E of FIG. 7.

Figure 8:
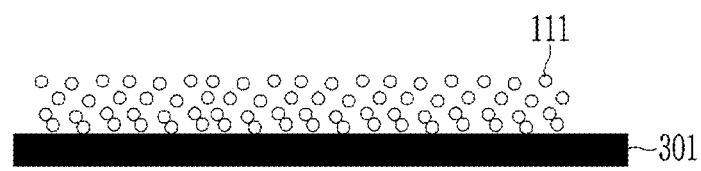
FIGS. 8 to 12 are schematic views showing the steps A to E of FIG. 7.

First, in a process of distributing the membrane-forming particle, the membrane-forming particle 111 is distributed on a first substrate 301 as shown in FIG. 8. The composition of the membrane-forming particle 111 may be the same as described above, and the first substrate 301 is not particularly limited as long as a material may be continuously transported or spiral-wound as shown in FIG. 7 and may be a plastic substrate such as polyethylene terephthalate (PET).

Figure 9:
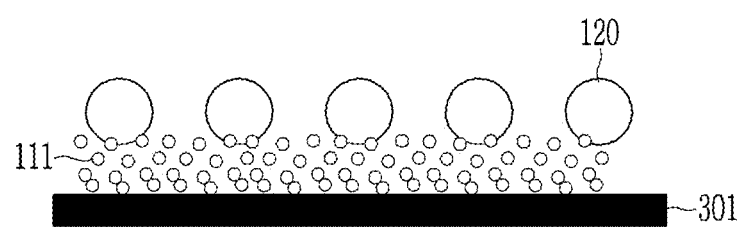

Separately, ion conductive particle 120 may be distributed on the first substrate 301. In an embodiment, as shown in FIG. 9, the ion conductive particle 120 may be distributed after distributing the membrane-forming particle 111. An embodiment is not necessarily limited thereto and the order of distributing ion conductive particle 120 and membrane-forming particle 111 may be changed.

In an embodiment, when the ion conductive particle 120 is distributed after distributing the membrane-forming particle 111, the ion conductive particle 120 may descend in a direction toward the first substrate 301 so that the ion conductive particle 120 is exposed to a lower surface when forming an ion conducting membrane 10.

Figure 10:
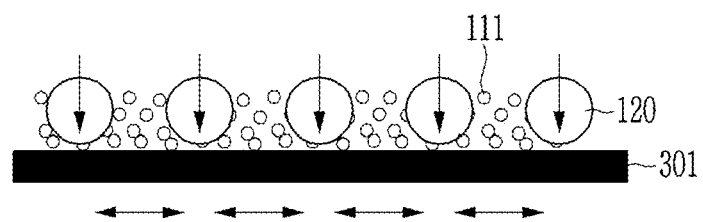

Specifically, in an embodiment, after distributing the ion conductive particle 120, the first substrate 301 may be vibrated to sink the ion conductive particle 120. In other words, as shown in FIG. 10, the membrane-forming particle 111 and the ion conductive particle 120 may be agitated in an axis of an extended direction of the first substrate 301. As the ion conductive particle 120 according to an embodiment have a higher specific gravity than the specific gravity of the membrane-forming particle 111, the ion conductive particle 120 may be disposed in a lower portion of the first substrate 301 by the agitation.

Also, during the agitation, the vibration applied to the first substrate may be controlled within the various ranges according to a size of the ion conductive particle 120 and the membrane-forming particle 111, a transporting speed of the first substrate 301, and the like, but is not particularly limited.

Figure 11:
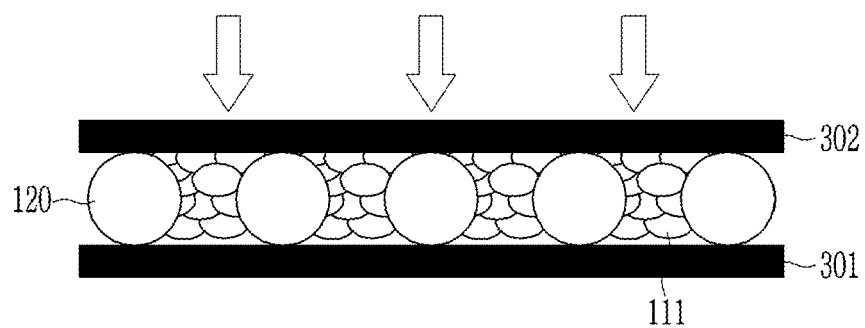

Thereafter, as shown in FIG. 11, a second substrate 302 may be disposed on the distributed (or after performing distribution and vibration) membrane-forming particle 111 and ion conductive particle 120, and the first substrate 301 and the second substrate 302 may be pressed.

In an embodiment, the pressing may be performed together with the heating. Specifically, when compressing the membrane-forming particle and the ion conductive particle, the distributed membrane-forming particle and ion conductive particle may be heated. For example, the first substrate 30 and the second substrate 302 may be heated at a predetermined temperature while pressing at the same time by a heatable press or the like.

In an embodiment, the pressing may be performed at a pressure of greater than or equal to about 1 megaPascal (MPa), for example, greater than or equal to about 2 MPa, and for example, less than or equal to about 50 MPa, less than or equal to about 40 MPa, or less than or equal to about 30 MPa, or it may be performed at a pressure of, for example, about 1 MPa to about 50 MPa or about 2 MPa to about 30 MPa.

When the pressure is less than about 1 MPa during the pressing process, the ion conductive particle 120 may be not exposed to each of the upper surface and the lower surface of the membrane and may be covered by the membrane substrate 110. When the pressure is greater than about 50 MPa, the ion conductive particle 120 may be damaged.

The heating may be performed at, for example, greater than or equal to about 110° C., greater than or equal to about 120° C., greater than or equal to about 130° C., or greater than or equal to about 140° C., and for example, less than or equal to about 300° C., less than or equal to about 250° C., less than or equal to about 200° C., or it may be performed at, for example, about 120° C. to about 300° C. or about 120° C. to about 250° C.

In addition, the heating may be performed for, for example, greater than or equal to about 10 seconds, greater than or equal to about 15 seconds, or greater than or equal to about 20 seconds, and for example, less than or equal to about 10 minutes, or less than or equal to about 5 minutes, and it may be performed for, for example, about 15 seconds to about 5 minutes, or about 20 seconds to about 5 minutes.

When the heating temperature and/or time are outside of these ranges, it may cause a lack of fusion among membrane-forming particle 111, and the mechanical strength and barrier properties of the ion conducting membrane 10 may be deteriorated. When the membrane-forming particle 111 is melted and then cured, the mechanical strength and barrier properties of the ion conducting membrane 10 may also be deteriorated.

Figure 12:
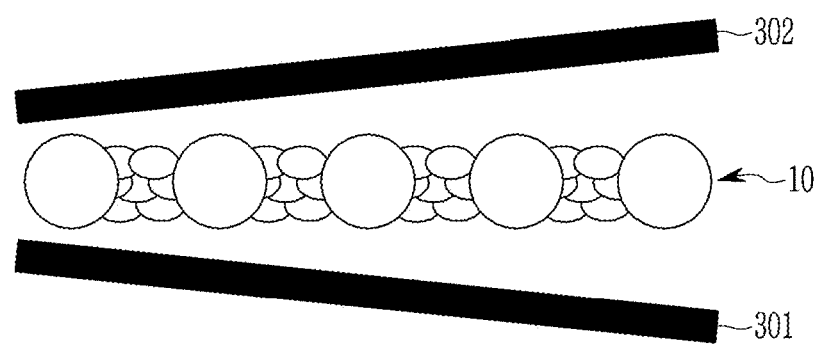

After completing the heating and the pressing, as shown in FIG. 12, the first substrate 301 and the second substrate 302 may be detached to provide an ion conducting membrane 10 according to an embodiment. In an embodiment, the order of detaching the first and the second substrates 301 and 302 is not limited. The detaching may be performed at the same time.

The obtained ion conducting membrane 100 may have improved mechanical strength and flexibility. The first and the second substrates 301 and 302 may be spiral-wound using a spiral-wound roll after detachment.

As described above, the method of manufacturing the ion conducting membrane according to an embodiment can be provided without a vacuum, and thus control the entire process relative to a wet process is facilitated, and the ion conducting membrane may be more easily mass produced in a continuous process, for example.

Hereinafter, a secondary battery including the ion conducting membrane according to an embodiment will be described.

Figure 13:
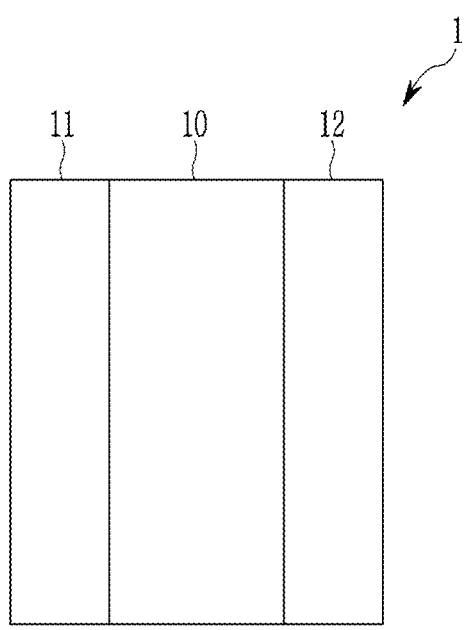
FIG. 13 is a schematic view showing in an embodiment of a secondary battery including an ion conducting membrane.

FIG. 13 is a schematic view showing a secondary battery including an ion conducting membrane according to an embodiment.

Referring to FIG. 13, the secondary battery 1 according to an embodiment includes a positive electrode 11, a negative electrode 12, an ion conducting membrane 10 interposed between the positive electrode 11 and the negative electrode 12.

First a negative electrode 12 may be prepared.

The negative electrode 12 may use a lithium metal thin film or may include a current collector and a negative active material layer disposed on the current collector. For example, the negative electrode 12 may be used in a state wherein the lithium metal thin film is disposed on a conductive substrate which is a current collector. The lithium metal thin film may be integrated with the current collector.

In the negative electrode 12, the current collector may comprise stainless steel, copper, nickel, iron, cobalt, or a combination thereof, and may include any suitable metallic substrate. For example, the current collector may be a conductive oxide substrate, a conductive polymer substrate, and the like. In addition, the current collector may have various structures. For example, a conductive metal, a conductive metal oxide, or a conductive polymer may be coated on one surface of the insulating substrate, or the entire substrate may be made of a conductive material. The current collector may be a flexible substrate. Thus the current collector may be easily bent. In addition, after bending, the current collector may be easily recovered to its original shape.

In addition, the negative electrode 12 may further include other negative active materials in addition to the lithium metal. The negative electrode 12 may include an alloy of lithium metal and other negative active materials, a composite of lithium metal and other negative active materials, or a mixture of lithium metal and other negative active materials.

Other negative active materials that may be included in the negative electrode 12 may be, for example, a metal capable of being alloyed with lithium, transition metal oxide, non-transition metal oxide, a carbon-based material, or a combination comprising at least one of the foregoing.

For example, the metal capable of being alloyed with lithium may be Si, Sn, Al, Ge, Pb, Bi, Sb, a Si—Y' alloy (wherein Y' is an element selected from an alkali metal, an alkaline-earth metal, a Group 13 element, a Group 14 element, a transition metal, a rare earth element, or a combination thereof, and not Si), a Sn—Y' alloy (wherein Y' is an element selected from an alkali metal, an alkaline-earth metal, a Group 13 element, a Group 14 element, a transition metal, a rare earth element, or a combination thereof, and not Sn), and the like. The element, Y' may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

For example, the transition metal oxide may be lithium titanium oxide, vanadium oxide, lithium vanadium oxide, and the like.

For example, the non-transition metal oxide may be $SnO_2$, $SiO_x$ (0<x<2), and the like.

The carbon-based material may comprise a crystalline carbon, an amorphous carbon, or a combination thereof. The crystalline carbon may be graphite such as amorphous, sheet-shaped, flake shaped, spherical shaped, or fiber-shaped natural graphite or artificial graphite, and the amorphous carbon may be soft carbon (e.g., carbon fired at low temperature) or a hard carbon, a mesophase pitch carbon, a fired cokes, and the like.

The negative electrode 12 may include a negative active material other than lithium metal. The negative electrode 12 may be obtained using any suitable negative active material composition other than lithium metal, a conductive agent, a binder, and a solvent.

For example, after preparing the suitable negative active material composition, it may be directly coated on a current collector to provide a negative electrode plate, or it may be casted on a separate support, and the negative active material film detached from the support may be laminated on the current collector to provide a negative electrode plate. The negative electrode is not limited to the mentioned shapes but may include any other suitable shapes. For example, the negative electrode may be obtained by further printing a negative active material ink including the suitable negative active material, an electrolyte solution, and the like on a current collector according to an inkjet.

The suitable negative active material may be in the form of powder. The powder negative active material may be employed for a negative active material composition or a negative active material ink.

The conductive agent may include carbon black, graphite particulate, and the like, but is not limited thereto, and may include any suitable carbon.

The binder may include a vinylidene fluoride/hexafluoropropylene copolymer, polyvinylidene fluoride (PVDF), polyacrylonitrile, polymethylmethacrylate, polytetrafluoroethylene, or a mixture thereof, or a styrene butadiene rubber-based polymer, and the like, but is not limited thereto, and may include any suitable binder.

The solvent may include N-methylpyrrolidone, acetone, or water, or the like, but is not limited thereto, and may include any suitable solvent.

The amounts of the suitable negative active material, the conductive agent, the binder, and the solvent are any amounts suitable for the secondary battery, particularly, the lithium secondary battery. At least one of the conductive agent, the binder, and the solvent may be omitted according to the usage and the structure of the secondary battery.

Next the positive electrode 11 may be fabricated as follows.

The positive electrode 11 may be obtained in accordance with the same procedure as in the negative active material composition, except that a positive active material is used instead of the negative active material.

In the positive active material composition, a conductive agent, a binder, and a solvent may be the same as in the negative active material composition. The positive active material, the conductive agent, the binder, and the solvent may be mixed to provide the positive active material composition. The positive active material composition may be directly coated on an aluminum current collector and dried to provide a positive electrode plate formed with a positive active material layer. Alternatively, the positive active material composition may be casted on a separate support, and then a film obtained by being detached from the support may be laminated on the aluminum current collector to provide a positive electrode plate formed with the positive active material layer.

The positive active material may be a lithium-containing metal oxide and may be any suitable material. For example, the positive active material may be a composite oxide of a metal selected from cobalt, manganese, nickel, and a combination thereof and lithium and specific examples thereof may be one of compounds represented by $Li_aA_{1-b}B'_bD_2$ (wherein, in the chemical formula, $0.90 \leq a \leq 1.8$ and $0 \leq b \leq 0.5$); $Li_aE_{1-b}B'_bO_{2-c}D_c$ (wherein, in the chemical formula, 0.90≤a≤1.8, 0≤b≤0.5, 0≤c≤0.05); $LiE_{2-b}B'_bO_{4-c}D_c$ (wherein, in the chemical formula, 0≤b≤0.5, 0≤c≤0.05); $Li_aNi_{1-b-c}Co_bB'_cD_\alpha$ (wherein, in the chemical formula, 0.90≤a≤1.8, 0≤b≤0.5, 0≤c≤0.05, 0<α≤2); $Li_aNi_{1-b-c}Co_bB'_cO_{2-\alpha}F'_\alpha$ (wherein, in the chemical formula, 0.90≤a≤1.8, 0≤b≤0.5, 0≤c≤0.05, 0<α<2); $Li_aNi_{1-b-c}Co_bB'_cO_{2-\alpha}F'_2$ (wherein, in the chemical formula, 0.90≤a≤1.8, 0≤b≤0.5, 0≤c≤0.05, 0<α<2); $Li_aNi_{1-b-c}Mn_bB'_cD_\alpha$ (wherein, in the chemical formula, 0.90≤a≤1.8, 0≤b≤0.5, 0≤c≤0.05, 0<α≤2); $Li_aNi_{1-b-c}Mn_bB'_cO_{2-\alpha}F'_\alpha$ (wherein, in the chemical formula, 0.90≤a≤1.8, 0≤b≤0.5, 0≤c≤0.05, 0<α<2); $Li_aNi_{1-b-c}Mn_bB'_cO_{2-\alpha}F'_2$ (wherein, in the chemical formula, 0.90≤a≤1.8, 0≤b≤0.5, 0≤c≤0.05, 0<α<2); $Li_aNi_bE_cG_dO_2$ (wherein, in the chemical formula, 0.90≤a≤1.8, 0≤b≤0.9, 0≤c≤0.5, 0.001≤d≤0.1); $Li_aNi_bCo_cMn_dGeO_2$ (wherein, in the chemical formula, 0.90≤a≤1.8, ≤b≤0.9, 0≤c≤0.5, 0≤d≤0.5, 0.001≤e≤0.1); $Li_aNiG_bO_2$ (wherein, in the chemical formula, 0.90≤a≤1.8, 0.001≤b≤0.1); $Li_aCoG_bO_2$ (wherein, in the chemical formula, 0.90≤a≤1.8, 0.001≤b≤0.1); $Li_aMnG_bO_2$ (wherein, in the chemical formula, 0.90≤a≤1.8, 0.001≤b≤0.1); $Li_aMn_2G_bO_4$ (wherein, in the chemical formula, 0.90≤a≤1.8, 0.001≤b≤0.1); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (0≤f≤2); $Li_{(3-f)}Fe_2(PO_4)_3$ (0≤f≤2); and $LiFePO_4$.

In the chemical formulae, A is Ni, Co, Mn, or a combination thereof; B' is Al, Ni, Co, Mn, Cr, Fe, Mg, Sr, V, a rare earth element, or a combination thereof; D is O, F, S, P, or a combination thereof; E is Co, Mn, or a combination thereof; F' is F, S, P, or a combination thereof; G is Al, Cr, Mn, Fe, Mg, La, Ce, Sr, V, or a combination thereof; Q is Ti, Mo, Mn, or a combination thereof; I' is Cr, V, Fe, Sc, Y, or a combination thereof; and J is V, Cr, Mn, Co, Ni, Cu, or a combination thereof.

For example, the positive active material may be $LiCoO_2$, $LiMn_xO_{2x}$ (x=1, 2), $LiNi_{1-x}Mn_xO_{2x}$ (0<x<1), $Ni_{1-x-y}Co_xMn_yO_2$ (0≤x≤0.5, 0≤y≤0.5), $LiFePO_4$, and the like.

The compounds may have a coating layer on the surface, or may be mixed with another compound having a coating layer. The coating layer may include at least one coating element compound of an oxide of a coating element, a hydroxide of a coating element, an oxyhydroxide of a coating element, an oxycarbonate of a coating element, or a hydroxyl carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed in a method having no adverse influence on properties of a positive active material by using these elements in the compound. For example, the method may include any coating method such as spray coating, dipping, and the like, the details of which can be determined by one of skill in the art without undue experimentation.

The amounts of the positive active material, the conductive agent, the binder, and the solvent are those suitable for the secondary battery, particularly, the lithium secondary battery.

Next, the ion conducting membrane 10 is prepared. The structure of the ion conducting membrane 10 is same as in above, and may be interposed between the negative electrode 12 and the positive electrode 11 to selectively block a material while allowing ions to pass.

As described above, the secondary battery 1 according to an embodiment may be an all-solid-state battery wherein the ion conducting membrane 10 is used as a separator and/or a separator-cum-electrolyte. That is, even in the case wherein the ion conducting membrane 10 according to an embodiment 10 is used as a separator for the all-solid-state battery, the secondary battery 1 may have improved electrochemical characteristics as described above.

In addition, the secondary battery 1 according to an embodiment has improved ion conductivity caused by the ion conducting membrane 10, and also provides improved efficiency and life-span by minimizing the side reaction of the electrode.

Hereinafter, the manufacturing of the ion conductive layer according to an embodiment and properties of the obtained ion conductive layer are illustrated in more detail with reference to examples. However, these examples are exemplary, and the present scope is not limited thereto.

EXAMPLES

Example 1

A zirconia particles having a diameter of 2 millimeters (mm) is used as ion conductive particle, and a foamed polystyrene bead (Eslen beads, low VOC type) manufactured by Sekisui Plastics Company is used as membrane-forming particle. The foamed polystyrene bead before the expansion has a diameter of 300 micrometers (μm), and after the expansion, the volume is 30 times greater.

A frame having a size of 10 mm×10 mm is created with a 2 mm spacer on a glass substrate having a thickness of 3 mm, then the zirconia particle is coarsely disposed in the frame by adding 5 zirconia particles. Subsequently, the foamed polystyrene bead is distributed in the frame, and then the frame is shaken to distribute the foamed polystyrene bead to the lower side of the zirconia particle.

Then a glass substrate is disposed on the frame, and then the disposed glass substrate is heated to 120° C. and pressed at a pressure of 2.5 megaPascals MPa for 5 minutes using a hot plate.

Then the disposed glass substrate is removed and cooled down by being allowed to stand for 3 minutes to provide an ion conducting membrane according to Example 1.

In the ion conducting membrane according to Example 1, the membrane-forming particle is thermally expanded and fused to anchor the zirconia particle, so that zirconia particle is not removed.

Example 2

An $Al_2O_3$ particle having a diameter of 200 μm is used as the ion conductive particle, and an acrylonitrile copolymer thermally-expandable particle (MicroShereFN-100SS) manufactured by Matsumoto Oils is used as the membrane-forming particle. The thermally-expandable particle before the expansion has a diameter of 9 μm, and after the expansion, a volume e is 30 times greater.

A frame having a size of 20 mm×20 mm is created with 200 μm spacers on a glass substrate having a thickness of 3 mm, then the $Al_2O_3$ particle is filled therein with almost no void. Subsequently, the thermally-expandable particle is distributed in the frame, and then the frame is shaken to distribute the thermal-expandable particle to the lower side of the zirconia particle.

Then a glass substrate is disposed on the frame, and the disposed glass substrate is heated at 130° C. to 140° C. and pressed at a pressure of 2.5 MPa for 5 minutes using a hot plate.

Then the disposed glass substrate is removed and cooled down by being allowed to stand for 3 minutes to provide an ion conducting membrane according to Example 2.

In the ion conducting membrane according to Example 2, the membrane-forming particle is thermally expanded and fused to anchor the $Al_2O_3$ particle, so the $Al_2O_3$ particle is not removed.

Comparative Example 1

A zirconia particle having a diameter of 50 µm is used as the ion conductive particle, and a cross-linking polystyrene particle (TECHPOLYMER SBX-6) having a diameter of 9 µm, which is the same before and after the expansion (i.e., no volume expansion), manufactured by Sekisui Plastics are used as the membrane-forming particle. The cross-linking polystyrene particle is a particle showing neither expandability nor fusion properties.

A frame having a size of 10 mm×10 mm is made with a 50 µm spacer on a glass substrate having a thickness of 3 mm, then a zirconia particle is coarsely disposed in the frame. Subsequently, the cross-linking polystyrene particles are distributed in the frame, and then the frame is shaken to distribute the cross-linking polystyrene particle to the lower side of the zirconia particle.

Then a glass substrate is disposed on the frame, and the disposed glass substrate is heated at 120° C. and pressed at a pressure of 2.5 MPa for 5 minutes using a hot plate.

Then the disposed glass substrate is removed and cooled down by being allowed to stand for 3 minutes.

However, according to Comparative Example 1, the membrane-forming particle is not fused together, so they do not provide a membrane substrate, and the membrane-forming particle does not anchor the zirconia particle, so they do not provide an ion conducting membrane.

Comparative Example 2

An ion conducting membrane according to Comparative Example 2 is obtained in accordance with the same procedure as in Comparative Example 1, except that a non-cross-linking acryl-polystyrene copolymer particle (TECHPOLYMER) manufactured by Sekisui Plastics having a diameter of 30 µm, which is the same before and after the expansion (no volume expansion), is used as the membrane-forming particle.

In Comparative Example 2, the acryl-polystyrene copolymer particle is a particle having fusion properties but showing no expandability.

It is confirmed that in the ion conducting membrane according to Comparative Example 2, the membrane-forming particle is thermally expanded and fused to anchor the zirconia particle, but zirconia particle is not adhered to each other and are instead removed, so the ion conducting membrane is broken and deficient in mechanical strength.

Comparative Example 3

A zirconia particle having a diameter of 50 µm is used as an ion conductive particle, and a polyethylene terephthalate (PET) pellet particle (TECHPOLYMER) manufactured by Sekisui Plastics having a diameter of 5 µm, which is the same before and after the expansion (no volume) is used as membrane-forming particle.

A frame having a size of 30 mm×30 mm is created with a 2 mm spacer on a glass substrate having a thickness of 2 mm, and then the zirconia particle are coarsely disposed in the frame. Subsequently, the PET pellet particle is distributed in the frame, and then the frame is shaken to distribute the PET pellet particle to the lower side of the zirconia particle.

Then after disposing a stainless steel substrate, which is the same kind as the stainless steel substrate on the frame, the two stainless steel substrates are fixed by a polyimide tape. It is heated in an oven at 300° C. for 30 minutes at the state.

Then it is cooled down by being allowed to stand for 10 minutes, and then the disposed stainless steel substrate is opened.

However, even if the ion conducting membrane according to Comparative Example 3 is heated in an oven at 300° C. for 30 minutes, the membrane-forming particles are not fused together, so the membrane substrate is not formed; and the membrane-forming particle does not anchor zirconia particle, so the ion conducting membrane, itself, is not formed.

Comparative Example 4

Comparative Example 4 is carried out in accordance with the same procedure as in Example 1, except a foamed polystyrene bead (Eslen beads) manufactured by Sekisui Plastics and having a diameter of 1200 µm, which is the same before and after the expansion (no volume), is used as membrane-forming particle.

However, according to Comparative Example 4, it is confirmed that the membrane-forming particle may form the membrane substrate, but the zirconia particle is removed, and the formed membrane substrate, itself, does not provide suitable mechanical strength and is broken.

Evaluation 1: Membrane Substrate Formation

Whether a membrane substrate may be completely formed, and whether the membrane substrate may have sufficient properties, is investigated.

First, for the investigation, a membrane substrate is formed as follows.

As membrane-forming particle, an acrylonitrile copolymer thermal expandable particle (MicroShereFN-100SS) manufactured by Matsumoto Oil is used. The thermal-expandable particle has a diameter before the expansion of 9 µm, and after the expansion, a volume 40 times greater (30 times diameter expansion), and the temperature starting the expansion is 125° C. to 135° C., and the temperature of maximum expansion is 145° C. to 155° C.

The acrylonitrile copolymer thermally expandable particle is distributed, each on different PET films, then the two PET films are attached so that the distributed surfaces are contacted, and then heated and pressed at 200° C. for 3 minutes under a pressure of 2.5 MPa by a heatable pneumatic press. Subsequently, the two PET films are sequentially detached to provide a membrane substrate without an ion conductive particle.

Figure 14:
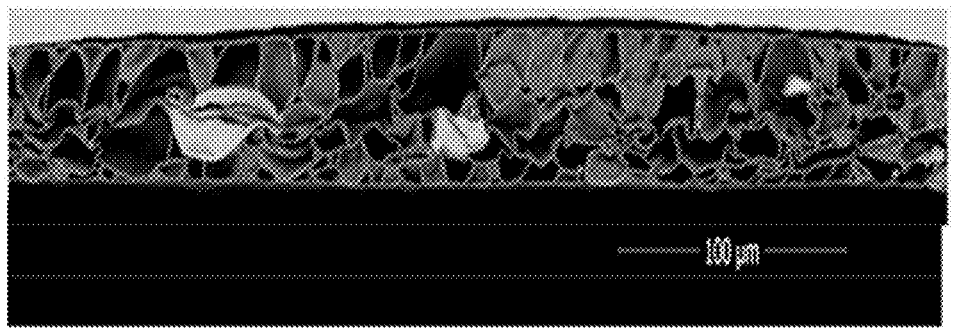
FIG. 14 is a scanning electron microscopy (SEM) image and is a cross-section view of a membrane substrate comprising membrane-forming particles.
Figure 15:
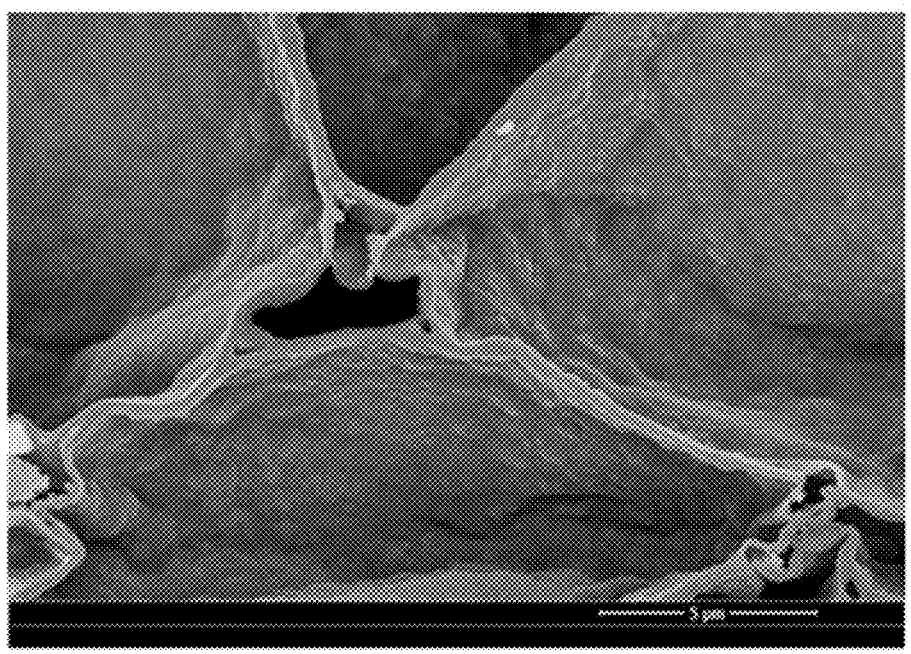
FIG. 15 is an enlarged view of a portion of FIG. 14.

Then a cross-sectional surface of the obtained membrane substrate is analyzed using a scanning electron microscope (SEM), and the results are shown in FIGS. 14 and 15.

FIGS. 14 and 15 are SEM images verifying that the membrane-forming particle according to an embodiment forms a membrane: FIG. 14 is an image showing a schematic cross-sectional surface of the membrane substrate, and FIG. 15 is an enlarged image of a region of FIG. 14.

Referring to FIGS. 14 and 15, it is confirmed that for the acrylonitrile copolymer thermally-expandable particle, adjacent thermally-expandable particles are fused together while the inner hollow core is enlarged by the thermal expansion. In addition, it is confirmed that the membrane substrate is sufficiently filled without a void with the thermally-expandable particle, and a hole exposing the upper surface and the lower surface of the membrane is not present.

From the results of FIGS. 14 and 15, it is shown that a membrane substrate may be formed so that material exchange may be blocked because when using the thermally-expandable particle there is no void, such as a hole, on the surfaces of the membrane.

Evaluation 2: Membrane Formation and Quality

Table 1 shows whether an ion conducting membrane is formed or not in Examples 1 to 2 and Comparative Examples 1 to 3 and the summarized characteristics of the obtained ion conducting membrane.

TABLE 1

|  | Ex. 1 | Ex. 2 | Comp. Ex. 1 | Comp. Ex. 2 | Comp. Ex. 3 |
| --- | --- | --- | --- | --- | --- |
| Ion conducting particle Material | zirconia | $Ai_2O_3$ | zirconia | zirconia | zirconia |
| Di (μm) | 2000 | 200 | 50 | 50 | 50 |
| Membrane-forming particle material | polystyrene | acrylonitrile copolymer | cross-linking polystyrene | non-cross-linking acryl polystyrene copolymer | PET |
| Fusion properties | Yes | Yes | No | Yes | Yes |
| Expandability | Yes | Yes | No | No | No |
| Dos (μm) | 300 | 8.5 | 6 | 30 | 5 |
| Volume expansion ratio | N = 30 | N = 30 | N = 1 | N = 1 | N = 1 |
| Membrane formation | Formed | Formed | Not formed | Formed | Not formed |
| Membrane quality | Excellent | Excellent | — | Inferior | — |

Volume expansion ratio is a ratio of the volume after expansion to the volume before expansion.

From Table 1, it is confirmed that a membrane substrate may be formed without losing the ion conductive particle because the membrane-forming particle has foaming and fusing properties, and the obtained ion conducting membrane has improved mechanical strength.

TABLE 2

|  | Ex. 1 | Ex. 2 | Comp. Ex. 4 |
| --- | --- | --- | --- |
| Ion conductive particle Material | zirconia | $Ai_2O_3$ | zirconia |
| Di (μm) | 2000 | 200 | 2000 |
| Membrane-forming particle Material | polystyrene | acrylonitrile copolymer | polystyrene |
| Dos (μm) | 300 | 8.5 | 1200 |
| Volume expansion ratio | 30 | 30 | 1 |
| Satisfaction of Equation 1 | Yes | Yes | No |
| Satisfaction of Equation 2 | No | Yes | No |
| Membrane quality | Excellent | Excellent | Inferior |
| Density of ion conductive particle in the membrane | Low density | High density | — |

Referring to Table 2, Example 1 does not satisfy Equation 2 but satisfies Equation 1, so the ion conducting membrane may be formed. As described above, the membrane-forming quality is also improved. Also, it is confirmed that the density of ion conductive particle in the membrane is lower than in Example 2.

As Example 3 satisfies both Equation 1 and Equation 2, the obtained ion conducting membrane may have improved quality, and also the ion conducting particle in the membrane may have a high density.

Comparative Example 4 satisfies neither Equation 1 nor Equation 2, all zirconia is removed, and the mechanical strength is also unfavorable although the membrane substrate is formed from the membrane-forming particle, so it may be not suitably employed for the ion conducting membrane.

From the results of Table 2, it is confirmed that the ion conducting membrane according to an embodiment may be formed when satisfying Equation 1, and the obtained ion conducting membrane may have further improved ion conductivity when satisfying both Equation 1 and Equation 2.

Examples 3 to 5 and Comparative Examples 5 to 9

A zirconia particle having a diameter of 50 μm is used as the ion conductive particle, and an acrylonitrile copolymer thermally-expandable particle (MicroShereF-35D or MicroShereFN-100SSD) manufactured by Matsumoto Oils is used as the membrane-forming particle.

The ion conductive particle and the thermal-expandable particles are each distributed on different PET films. Then two PET films are attached so that the distributed surfaces are contacted, and then are heated and pressed at a predetermined temperature, for a predetermined time, and under a predetermined pressure by a pneumatic press. Then the two PET films are sequentially detached to provide an ion conducting membrane.

Table 3 shows ion conductive particles employed for Examples 3 to 5 and Comparative Examples 5 to 9, properties of the membrane-forming particles, and the membrane-forming conditions.

TABLE 3

| | Ex. 3 | Ex. 4 | Example 5 | Comp. Ex. 5 | Comp. Ex. 6 | Comp. Ex. 7 | Comp. Ex. 8 | Comp. Ex. 9 |
|---|---|---|---|---|---|---|---|---|
| Ion conductive particle material | zirconia | zirconia | zirconia | zirconia | zirconia | zirconia | zirconia | zirconia |
| Di (μm) | 50 | 50 | 50 | 50 | 50 | 50 | 50 | 50 |
| Membrane-forming particle material | MicroShere F-35D | MicroShere F-35D | MicroShere FN-100SSD | MicroShere F-35D | MicroShere F-35D | MicroShere F-35D | MicroShere F-35D | MicroShere FN-100SSD |
| Dos (μm) | 15 | 15 | 9 | 15 | 15 | 15 | 15 | 9 |
| Volume expansion ratio | 250 | 250 | 60 | 250 | 250 | 250 | 250 | 60 |
| Expansion starting temperature (° C.) | 75 | 75 | 125 | 75 | 75 | 75 | 75 | 125 |
| Maximum expansion temperature (° C.) | 105 | 105 | 150 | 105 | 105 | 105 | 105 | 150 |
| Membrane-forming Temperature (° C.) | 160 | 180 | 190 | 160 | 110 | 160 | 160 | 190 |
| Pressure (MPa) | 2.5 | 2.5 | 25 | 0.5 | 2.5 | 2.5 | 2.5 | 0.025 |
| Time (sec) | 30 | 30 | 240 | 30 | 30 | 5 | 600 | 240 |

Evaluation 4: Surface of Ion Conductive Particle Exposure

The upper surfaces and the lower surfaces of the ion conducting membranes according to Examples 3 to 5 and Comparative Examples 5 to 9 are observed by a scanning electron microscopy (SEM) to determine whether the ion conductive particles are exposed from both the upper surface and the lower surface.

First, it is confirmed that the zirconia particle is exposed on both the upper surface and the lower surface of the ion conducting membranes according to Examples 3 to 5. However, it is confirmed that although the zirconia particle is exposed on the upper surfaces of the ion conducting membranes according to the Comparative Examples, the zirconia particle is rarely exposed on the lower surfaces or is covered with the membrane-forming particle.

More particularly, FIGS. 16 to 17 and FIGS. 18 to 19 show surface images of ion conducting membranes according to Example 5 and Comparative Example 9, respectively.

Figure 16:
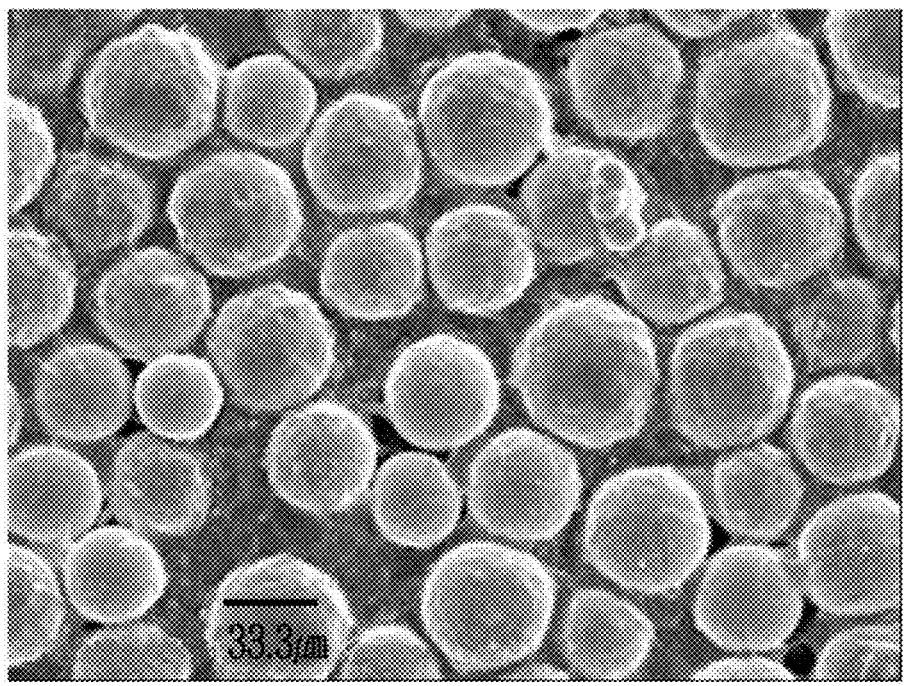
FIG. 16 is a SEM images of an upper surface of an ion conducting membrane according to Example 5.
Figure 17:
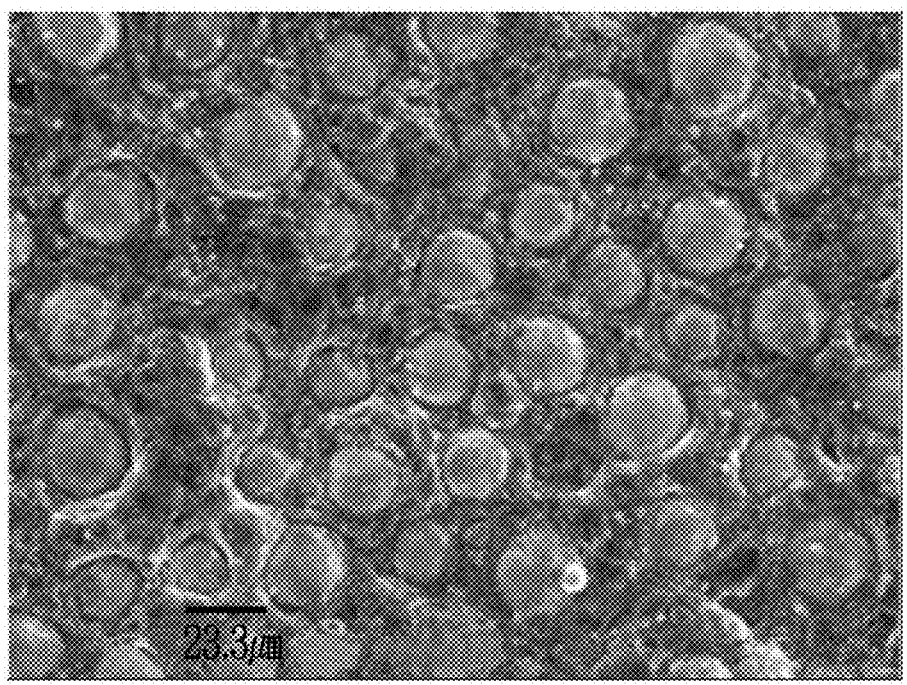
FIG. 17 is a SEM images of a lower surface of an ion conducting membrane according to Example 5.
Figure 18:
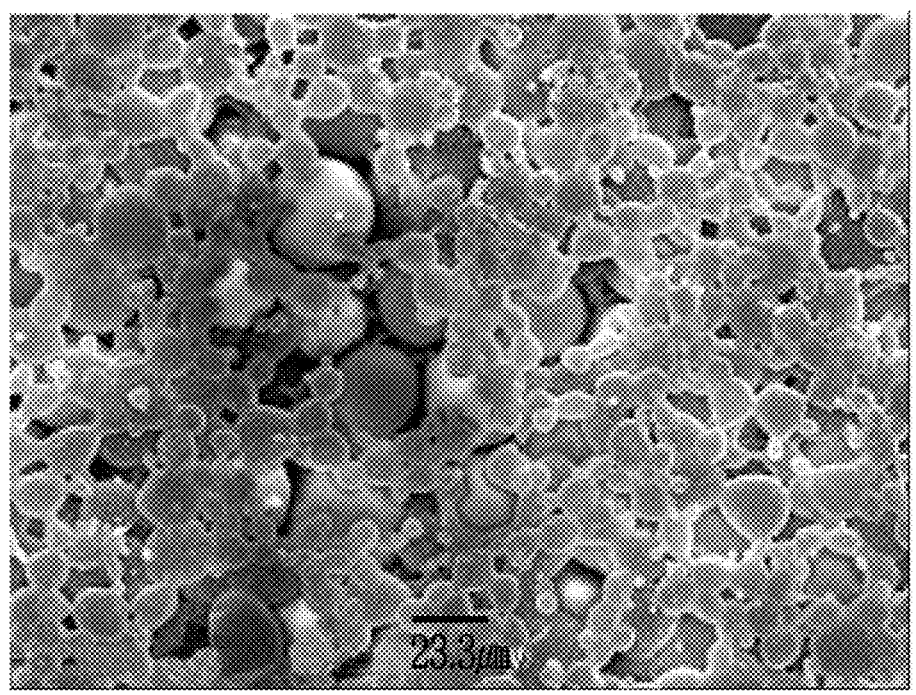
FIG. 18 is an SEM images of an upper surface of an ion conducting membrane according to Comparative Example 9.
Figure 19:
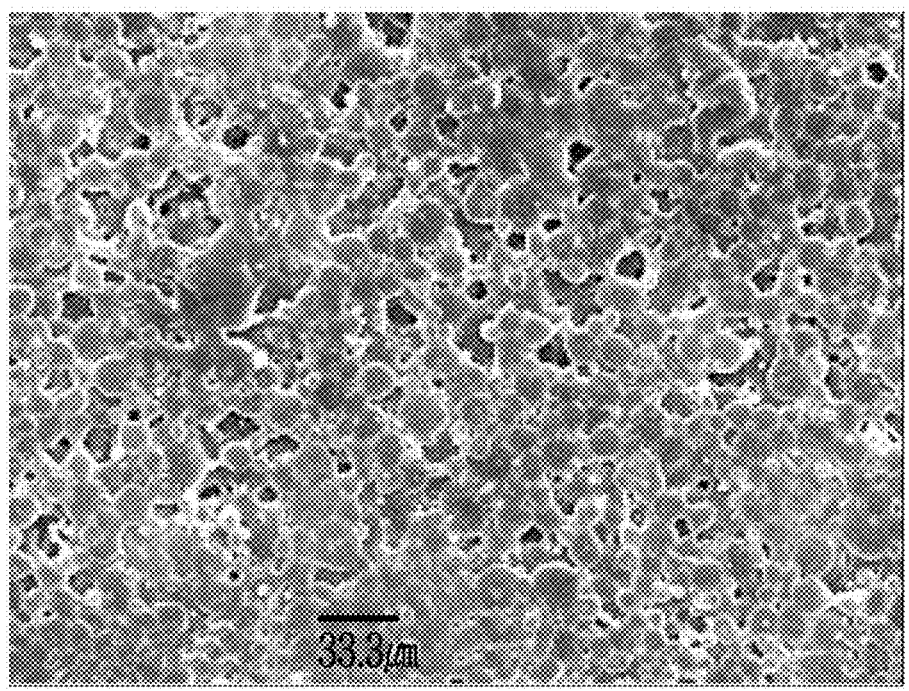
FIG. 19 is an SEM images of a lower surface of an ion conducting membrane according to Comparative Example 9.

FIGS. 16 to 17 are SEM images showing the ion conducting membrane according to Example 5: FIG. 16 shows the upper surface, and FIG. 17 shows the lower surface; and FIGS. 18 to 19 are SEM images showing the ion conducting membrane according to Comparative Example 9: FIG. 18 shows the upper surface, and FIG. 19 shows the lower surface.

Referring to FIGS. 16 to 17, it is confirmed that the zirconia particle is exposed on the surface of the ion conducting membrane according to Example 5. On the other hand, referring to FIGS. 18 to 19, it is confirmed that the zirconia particle on the upper surface of the ion conducting membrane according to Comparative Example 9 is almost covered so rarely shown, and also zirconia particle on the lower surface is completely covered.

From the results, it is confirmed that when satisfying the ranged conditions during the pressing and heating process, an ion conducting membrane may be obtained in which the ion conductive particle is exposed from both surfaces, as in the Examples.

Also, it is confirmed that the membrane-forming particle is insufficiently fused together in Comparative Examples 5 and 6, and it is confirmed that membrane-forming particle is melted and then cured in Comparative Example 8.

From the results, it is confirmed that when the conditions are outside of the stated ranges during the pressing and heating process, membrane-forming particles are insufficiently fused, or the membrane-forming particle is melted, resulting in a membrane with inferior mechanical strength, flexibility, and barrier properties.

While this disclosure has been described in connection with what is presently considered to be practical example embodiments, it is to be understood that the disclosed membrane is not limited to the disclosed embodiment, but, on the contrary, is intended to cover various modifications and equivalent arrangements included within the spirit and scope of the appended claims.

What is claimed is:

1. An ion conducting membrane, comprising:
   a membrane substrate comprising a membrane-forming particle, and
   an ion conductive particle disposed on the membrane substrate,
   wherein the membrane-forming particle comprise an expandable material, and
   the ion conductive particle is exposed on both an upper surface and an opposing lower surface of the membrane substrate.

2. The ion conducting membrane of claim 1, wherein the membrane substrate has an electrical conductivity of less than $10^{-7}$ Siemens per centimeter.

3. The ion conducting membrane of claim 1, wherein the expandable material comprises a thermoplastic resin, a thermal fusion resin, or a combination thereof.

4. The ion conducting membrane of claim 1, wherein the membrane substrate comprises a fused product of at least two expanded membrane-forming particles.

5. The ion conducting membrane of claim 1, wherein
   the membrane-forming particle comprises a hollow core, and
   a shell surrounding the core, wherein the shell comprises the expandable material.

6. The ion conducting membrane of claim 5, wherein the membrane-forming particle consists of the expandable material and comprises at least two pores thereinside.

7. The ion conducting membrane of claim 1, wherein a diameter of the membrane-forming particles before expansion satisfies Equation 1:

Equation 1

$Dos \leq Di/(2 \ast N^{1/3})$ wherein

Di is a diameter of the ion conductive particles,

Dos is a diameter of the membrane-forming particles before expansion, and

N is a ratio of a volume after expansion relative to a volume before expansion of the membrane-forming particles.

8. The ion conducting membrane of claim 7, wherein Di, Dos, and N satisfy Equation 2:

Equation 2

$Dos \leq Di/(0.155*N^{1/3})$.

9. The ion conducting membrane of claim 7, wherein N is from about 10 to about 500.

10. The ion conducting membrane of claim 1, wherein the ion conductive particle conducts a lithium ion, a sodium ion, a proton, a potassium ion, an iron ion, a zinc ion, a magnesium ion, a potassium ion, or a combination comprising at least one of the foregoing.

11. The ion conducting membrane of claim 1, wherein the ion conductive particle has an ion conductivity of about $1 \times 10^{-5}$ Siemens per centimeter to about $1 \times 10^{-3}$ Siemens per centimeter.

12. The ion conducting membrane of claim 1, wherein the ion conductive particle comprises a sulfide, an oxide, a nitride, or a combination comprising at least one of the foregoing.

13. The ion conducting membrane of claim 1, wherein
the ion conductive particle comprises $ZrO_2$, $AlO_3$, a compound represented by Chemical Formula 1 to Chemical Formula 4

Chemical Formula 1

$Li_3La_{(2/3-x)}TiO_3$,

Chemical Formula 2

$Li_yLa_3M^1{}_2O_{12}$,

Chemical Formula 3

$Li_{(2-2z)}Zn_{(1-z)}GeO_4$,

Chemical Formula 4

$LiM^2{}_2(PO_4)_3$, or a combination comprising at least one of the foregoing, wherein, in Chemical Formula 1 to Chemical Formula 4, $M^1$ is zirconium, niobium, tantalum, antimony, bismuth, or a combination comprising at least one of the foregoing, $M^2$ is germanium, titanium, hafnium, zirconium, or a combination comprising at least one of the foregoing, and $0 \leq x \leq 2/3$, $5 \leq y \leq 7$, and $0 \leq z \leq 1$.

14. The ion conducting membrane of claim 1, wherein the ion conductive particle has a specific gravity which is greater than a specific gravity of the membrane-forming particle.

15. The ion conducting membrane of claim 1, wherein a thickness of the ion conducting membrane is from about 15 micrometers to about 100 micrometers.

16. A method of making the ion conducting membrane of claim 1, the method comprising:
  distributing the membrane-forming particle on a first substrate;
  distributing the ion conductive particle on the first substrate; and
  compressing the membrane-forming particle and the ion conductive particle to make the ion conducting membrane.

17. The method of claim 16, wherein the distributing of the ion conductive particle is after the distributing of the membrane-forming particle.

18. The method of claim 17, wherein further comprising vibrating the first substrate after distribution of the ion conductive particles to settle the ion conductive particle.

19. The method of claim 16, wherein the compressing the membrane-forming particles and the ion conductive particles further comprises disposing a second substrate on the distributed membrane-forming particle, the ion conductive particle, and the first substrate, and pressing the first substrate, the membrane-forming particle, the ion conductive particle, and the second substrate.

20. The method of claim 19, wherein the pressing is performed at a pressure of about 1 megaPascal to about 50 megaPascals.

21. The method of claim 19, wherein the compressing the membrane-forming particle and the ion conductive particle further comprises heating the distributed membrane-forming particle and ion conductive particle.

22. The method of claim 21, wherein the heating is performed at a temperature of about 120° C. to about 300° C. for about 15 seconds to about 5 minutes.

23. A secondary battery, comprising:
  a positive electrode;
  a negative electrode; and
  the ion conducting membrane according to claim 1 between the negative electrode and the positive electrode.

* * * * *